(12) United States Patent
Ekich

(10) Patent No.: US 6,474,584 B2
(45) Date of Patent: Nov. 5, 2002

(54) FLY TYING METHOD AND APPARATUS

(76) Inventor: Faruk Ekich, 14 Lismore Court, Brampton, On. (CA), L6Z 1W1

( * ) Notice: Subject to any disclaimer, the term of this patent is extended or adjusted under 35 U.S.C. 154(b) by 32 days.

(21) Appl. No.: 09/785,922

(22) Filed: Feb. 20, 2001

(65) Prior Publication Data

US 2002/0113159 A1 Aug. 22, 2002

(51) Int. Cl.⁷ .................. B65H 54/553; B65H 75/48
(52) U.S. Cl. ............. 242/371; 242/129.53; 242/423.1; 242/442; 242/588; 43/4; 289/17
(58) Field of Search ............... 242/422.4, 156, 242/423.1, 442, 588, 405, 371, 416, 129.53, 423.2; 43/4; 289/17

(56) References Cited

U.S. PATENT DOCUMENTS

| | | | | |
|---|---|---|---|---|
| 2,388,121 A | * | 10/1945 | Carbonneau | 242/422.4 |
| 2,479,710 A | * | 8/1949 | Arnold | 242/156 |
| 2,514,264 A | * | 7/1950 | Soper | 242/156 |
| 4,462,551 A | * | 7/1984 | Bloch | 242/442 |
| 4,842,215 A | * | 6/1989 | Takami | 242/422.4 |
| 4,870,772 A | * | 10/1989 | Johns | 289/17 |
| 5,076,510 A | * | 12/1991 | Norlander | 242/422.4 |
| 5,752,670 A | * | 5/1998 | Lasecki et al. | 242/416 |
| 6,179,240 B1 | * | 1/2001 | Todd | 242/442 |

* cited by examiner

*Primary Examiner*—Michael R. Mansen
(74) *Attorney, Agent, or Firm*—D. W. Eggins; Eric Spencer

(57) ABSTRACT

A spring-loaded bobbin for use in tying fly fishing lures has a simple frame carrying a support mechanism having a centered bearing by which an off-the-shelf spool of tying thread is rotatably mounted. The frame carries a thread guide tube that is centered on and extends at rightangles to the spool axis, to receive and deliver the thread. The spool support mechanism includes a coil spring that is tensioned upon the withdrawal of thread from off the spool, so that, on release of the thread by the user, the spool is reverse wound by the tensioned spring, to take up the slack in the thread.

9 Claims, 3 Drawing Sheets

FLY TYING METHOD AND APPARATUS

BACKGROUND OF THE INVENTION

1. Field of the Invention

This invention relates to fly tying. More specifically, the present invention relates to an improved fly tying apparatus and method for the production of high quality man-made flies for use in the sport of fly fishing.

2. Summary of the Prior Art

The tying of fishing flies is growing as a hobby and a business form. A considerable part of the art of fly tying is the actual wrapping of the selected materials to the hook, in order to create the desired form with required proportions and precision.

The most important technical factors in this endeavor are the thread properties and precise thread control. The length of the thread between the bobbin and tying point affects the thread control.

The essential properties of thread, such as flatness, degree of twist, uniform tension, stretch, evenness of wax distribution and layering are carefully controlled during the manufacturing and spooling onto the standard fly tying thread spool commonly used by the fly tyer. Care is taken by tyer not to change these properties.

Most of the thread suppliers have standardized on the plastic spool designed for the use with the "wishbone" style bobbin. This spool has the following features:

Inner arbor and a drum which are concentric to a common axis.

Arbor and the drum, on which the thread is wound, are tubular and are connected by four or six radial, web like, spokes running along the central axis.

Four or six empty spaces created between the arbor, drum and two spokes are open to the side faces of the spool.

Diameter of the aperture of the inner arbor is approximately 0.300" (7.62 mm).

Most of the spools are 1.225" (31.1 mm) long and rim of the outer arbor is approximately 1" (25.4 mm).

Label is glued on one side face of the spool, having a hole, which provides the access to the aperture of inner arbor.

When viewed from the label side of the spool, the thread is dispensed in the clockwise direction.

The fly tying bobbin as a tool, should provide the needed thread control, protect and maintain the thread properties and enable the tier to quickly change the spools (threads), during the process of tying.

The most basic, commonly used bobbin is a "wishbone" design, consisting of a pair of spring wire legs with a spherical spool holder on the end of each leg. A thread-guiding tube is affixed to the juncture of the legs, protruding forwardly in the same plenum.

This popular bobbin design provides necessary features such as:

Dispensing of the thread under the spring tension sufficient to hold the bobbin's weight without unwinding.

Maintains the thread properties built in on the standard "off the shelf" spool.

Provides quick thread changes when needed.

The disadvantage of this bobbin is that it needs to be rewound manually anytime excess thread is taken off the spool during the fly tying process. This is repeated several times during the process of fly tying and is a time-consuming action. Each time the thread is rewound on the spool, the thread properties are disturbed and the quality of the man-made fly is diminished.

Some attempts have been made in the past to develop improved bobbins with the objective to save the time used to manually rewind the excess thread by means of automatic rewind.

Among these are U.S. Pat. No. 4,462,551 to Bloch and U.S. Pat. No. 5,076,510 to Norlander. Both of these incorporate custom spools which are an integral part of the bobbin designs, thus requiring re-spooling of the thread from the standard fly tying thread spool. This approach presents several distinct disadvantages including, unwanted twist to the thread during re-spooling, variations in the tension and stretch of the thread, altering the wax distribution as the result of additional handling and uneven layering and a more complicated and more time-consuming thread change over process.

There exists therefore a need for an improved method an apparatus for the production of high-quality man-made flies for use in the sport of fly fishing which precisely controls the properties of the thread as it is applied to the fly.

SUMMARY OF THE INVENTION

The primary objective of the present invention is to provide an improved method and apparatus for the production of man-made flies to be used in the sport of fly-fishing.

Another object of the present invention is to provide a method and apparatus for the improved control of the thread used during the production of a man-made fly.

Yet another object of the present invention is to provide a method and apparatus which reduces the time to produce man-made flies.

The foregoing objects are achieved by the present invention which is an improved fly tying bobbin, that can dispense and automatically rewind a predetermined length of thread from the standard plastic spool, on which the thread is commonly sold, while maintaining thread tension. This is accomplished by a system utilizing a coiled flat spring.

As the thread is drawn (dispensed) off the spool, the spring is tensioned. The energy stored within the spring is used to rewind the drawn thread back on to the spool automatically. When the full, predetermined length of thread, is drawn to its limit (approximately 16 to 18 inches or 400 to 450 mm), or at any time during the operation, the tension of the spring can be instantaneously released, resetting it to the starting position. It will also permit any additional length of thread to be manually rewound back to the spool when the spring is in the resting (no tension) position. This bobbin simplifies and speeds up the operation of fly tying beyond existing designs.

Further objections and advantages of the present invention will appear hereinbelow.

DETAILED DESCRIPTION OF THE PREFERRED EMBODIMENTS

Figure 1:
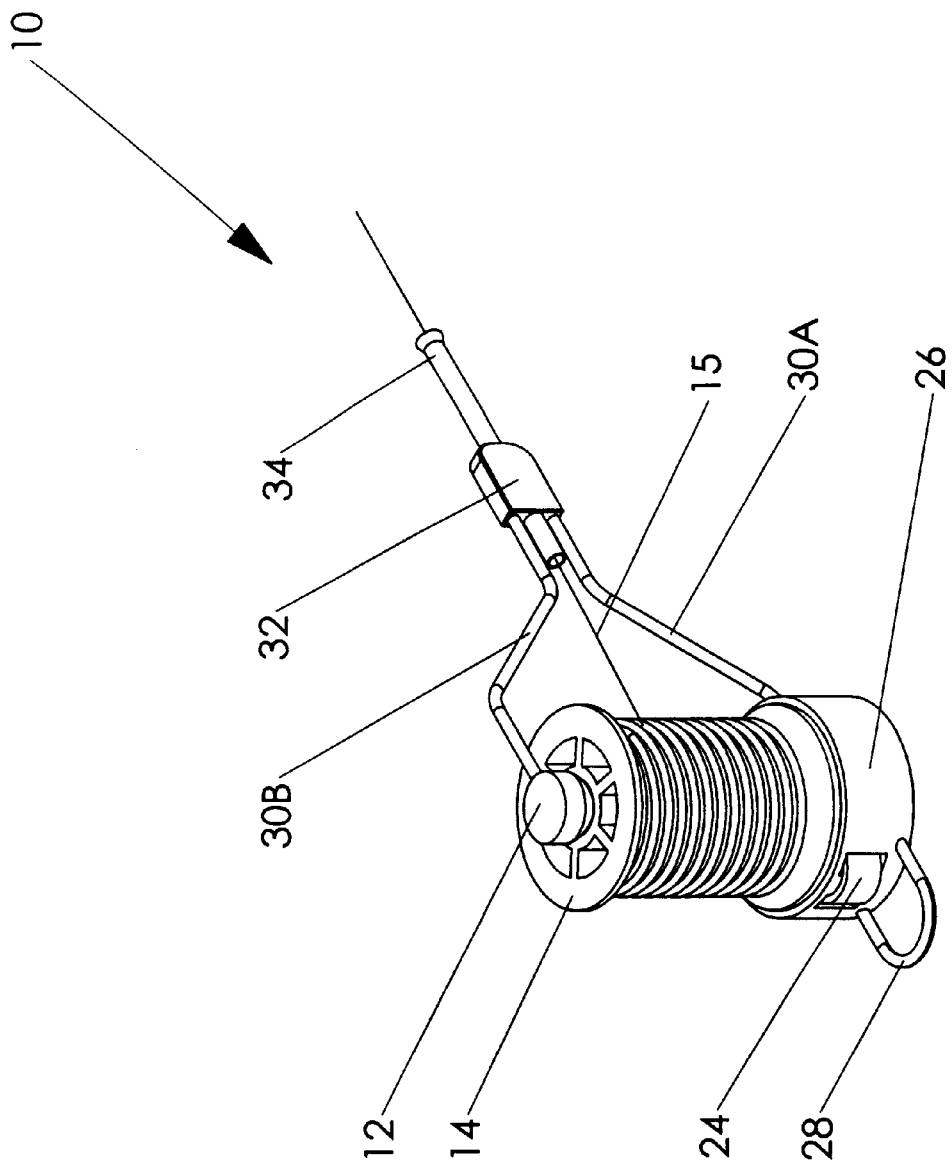
FIG. 1 shows an assembled bobbin with a standard plastic spool mounted thereon.
Figure 2A:
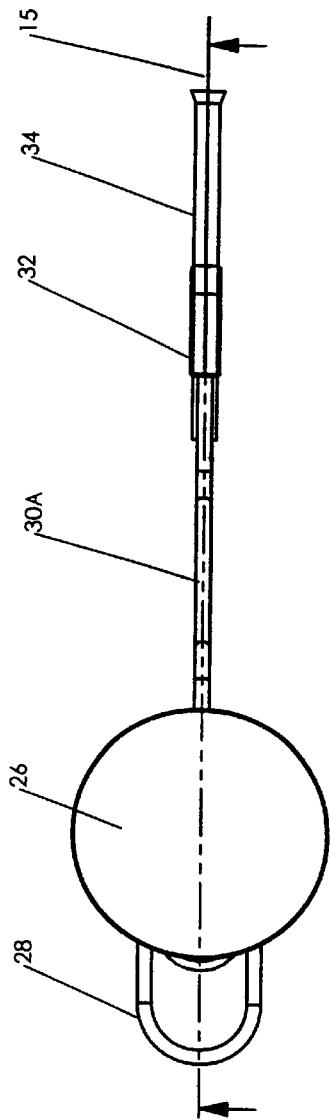
FIG. 2A is a side view of the FIG. 2 embodiment.
Figure 2:
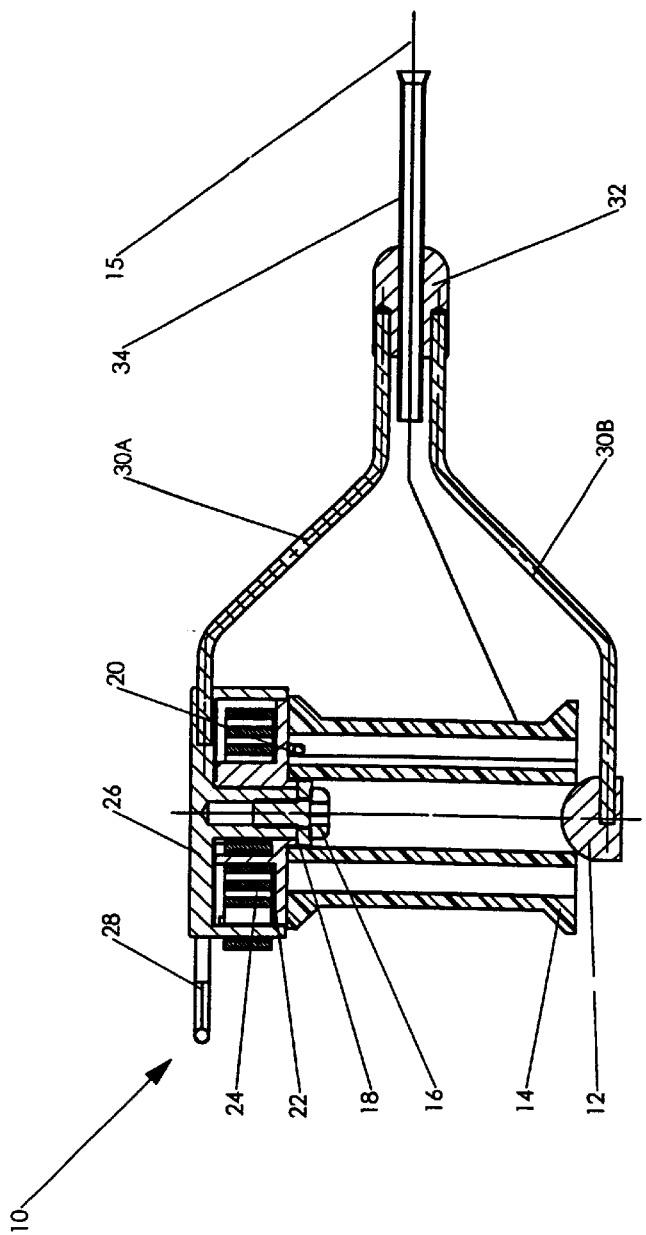
FIG. 2 shows a section view of the bobbin and a standard plastic spool.
Figure 3:
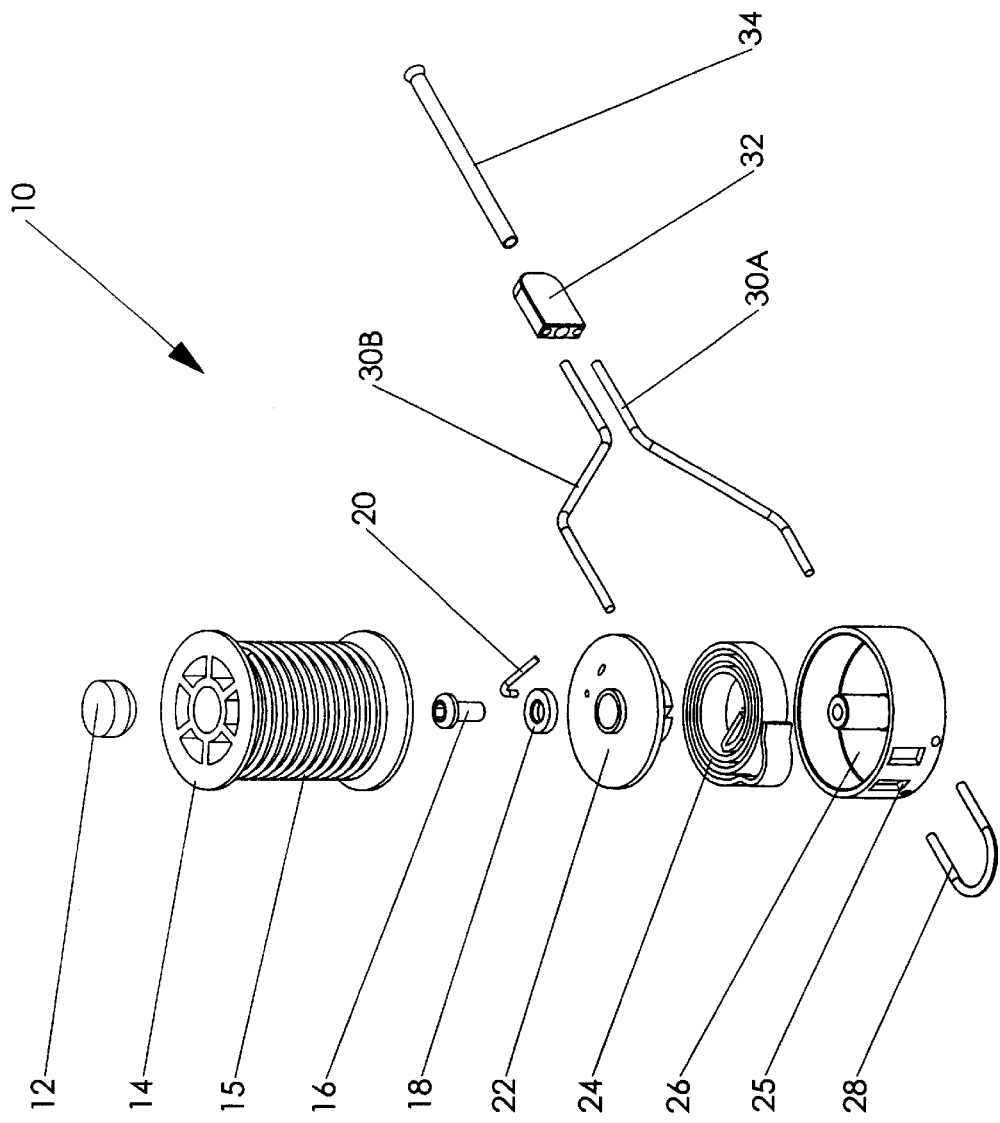
FIG. 3 shows an exploded view of the bobbin and a standard plastic spool.

Referring to the figures, a preferred embodiment 10 the present invention is generally shown. This embodiment comprises a journal 12 which interfaces with a center hole in a spool 14. The spool 14 is an industry standard spool provided by a number of well known manufacturers. On the spool 14 is a thread or other material 15 which is suitable for the fabrication of man-made flies for use in fly fishing. A spring cover 22 is in communication with a spring 24 and the spring cover 22 is further in communication with spool 14. The spring 24 in this preferred embodiment is a thin sheet-like torsion spring well known in the art. However, any spring like mechanism could easily be fashioned to perform the same function including extension springs, compression springs or the like.

The spring cover 22 is inserted in a housing 26 and is rotatably mounted therein by the use of a cylinder 18 and a fastener 16. The spring cover 22 interfaces with one end of spring 24 so that as the cover 22 is rotated, energy is stored in the spring which will tend to return the cover 22 to its original starting point.

A pin 20 protrudes from the surface of the spring cover 22 and interfaces with the spool 14 for communication of the spring forces to the spool 14. A notch 25 is provided in housing 26 for insertion of spring 24 which prevents the other end of the spring 24 from rotating, thereby causing potential energy to be stored in spring 24 whenever spool 14 is rotated.

Rigidly affixed to journal 12 is a first arm 30a which extends outwardly from spool 14 and terminates approximately at the center of the longitudinal axis of the spool 14 at a union 32. Rigidly affixed to housing 26 is a second arm 30b which extends coextensive with first arm 30a and also terminates at union 32. Arms 30a and 30b support and guide the union 32. Rigidly affixed and approximately central to the union 32 and in communication with a hole in union 32 is a tube 34. The tube 34 is sized to receive and further communicate thread 15 from spool 14 to the man-made fly. The arms 30a and 30b and tube 34 form a frame for the user to hold the apparatus in their hand.

A handle 28 is provided on housing 26 which allows the user to spread open the arms 30a and 30b for removal and insertion of different spools 14. Alternatively, selectable actuation of handle 28 will disengage pin 20 from spool 14, thereby allowing any potential energy stored in spring 24 to be released without rewinding thread 15 onto spool 14.

As the reader can see, the preferred embodiment 10 provides a means for drawing out a predetermined length of thread 15 for use in the fly tying process. A notable feature of the preferred embodiment is the ability of the device to keep tension on the thread 15 as it is unwound from spool 14. A further advantage of the present invention is the use of the spring 24 to automatically rewind any excess thread 15 that may have been created during the fly tying process.

It is to be understood that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. A fly tying apparatus for dispensing tying thread, to provide thread control properties, comprising:
    a frame having a thread guidance tube to receive the insertion of a fly tying thread for passage therethrough;
    a spool bearing supported by said frame for the manually removable insertion of an industry standard thread spool in rotatable, supported relation with said bearing; a said standard thread spool, having thread therefrom passing through said tube; a spring; mechanical connection means connecting said spring with the exterior of said spool, to tension the spring upon rotation of the spool in a first direction, on withdrawal of a portion of said thread in tensioned relation from said spool; wherein, upon release of the thread said spring rotates the spool in a direction reverse to said first direction, to rewind at least a portion of the withdrawn thread upon the spool; and wherein said spool may be readily manually replaced by another said standard spool without recourse to tools.

2. The fly tying apparatus of claim 1 further comprising a spring cover in communication with said spring and said spool for the selectable transmission of energy.

3. The fly tying apparatus of claim 2 wherein said spring cover further comprises:
    a slot for interface with a first end of said spring; and a pin which protrudes from said spring cover and interfaces with said spool for the communication of rotational displacement to said spool.

4. The fly tying apparatus of claim 3 further comprising:
    a housing for insertion of said spring, said housing comprising a notch for the insertion of a second end of said spring;
    said spring cover rotatably mounted on said housing by a fastener;
    a handle rigidly affixed to and protruding from said housing; said frame including a pair of arms; at least one of said pair of arms extending from said housing such that said pair of arms may be spread apart by applying pressure to said handle.

5. The fly tying apparatus of claim 1 having said tube rigidly affixed to a pair of arms forming part of said frame to facilitate the handling and dispensing of said thread.

6. A fly tying method exhibiting improved thread dispensing access and control properties comprising the steps of:
    providing a standard spool of tying thread; providing a frame having a spool bearing to receive said standard spool in manually inserted, removable relation with the bearing;
    inserting said spool in rotatable, supported relation with said bearing; providing a spring external to said spool and in communication with said spool such that rotation of said spool in one direction by withdrawal of said thread from off the spool stores energy in said spring, and release of said thread releases energy from said spring to said spool, to rewind at least a portion of the withdrawn said thread onto the spool; said frame including a hollow tube for the guidance of said thread to a man-made fly for use in the sport of fly fishing.

7. The fly tying method of claim 6 further comprising the step of providing a spring cover in communication with said spring and said spool for the selectable transmission of energy.

8. The fly tying method of claim 7 wherein providing said spring cover further comprises the steps:
    providing a slot for interfacing with a first end of said spring; and
    providing a pin which protrudes from said spring cover and interfacing with said spool for the communication of said spool rotational displacement.

9. The fly tying method of claim 8 further comprising the steps of:
    providing a housing for insertion of said spring, said housing providing a notch for the insertion of a second end of said spring;
    said spring cover rotatably mounted on said housing by a fastener;
    providing a handle rigidly affixed to and protruding from said housing;
    providing at least one of said pair of arms extending from said housing such that said pair of arms may be spread apart by applying pressure to said handle.

\* \* \* \* \*